(12) United States Patent
Tanida et al.

(10) Patent No.: US 7,227,577 B2
(45) Date of Patent: Jun. 5, 2007

(54) SOLID-STATE IMAGING MODULE WITH FRICTIONALLY ATTACHED SHIELD CAP

(75) Inventors: Yoshinori Tanida, Nara (JP); Kenji Sakai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 656 days.

(21) Appl. No.: 10/307,810

(22) Filed: Dec. 2, 2002

(65) Prior Publication Data

US 2003/0112364 A1 Jun. 19, 2003

(30) Foreign Application Priority Data

Dec. 4, 2001 (JP) ............................. 2001-370657

(51) Int. Cl.
*H04N 5/225* (2006.01)
*G02B 13/16* (2006.01)
*G03B 17/00* (2006.01)

(52) U.S. Cl. .................... 348/340; 348/374; 396/448

(58) Field of Classification Search ........ 348/373–375, 348/340; D16/200–204, 208, 218, 219; 396/448
See application file for complete search history.

(56) References Cited

U.S. PATENT DOCUMENTS

| | | | |
|---|---|---|---|
| 4,318,133 A * | 3/1982 | Ohtake ........................ | 348/376 |
| 5,400,072 A | 3/1995 | Izumi et al. | |
| 5,673,083 A * | 9/1997 | Izumi et al. ................. | 348/340 |
| 6,091,082 A | 7/2000 | Thomas et al. | |
| 6,180,989 B1 | 1/2001 | Bryant et al. | |
| 6,483,101 B1 * | 11/2002 | Webster ....................... | 250/216 |
| 6,665,455 B1 * | 12/2003 | Ting ........................... | 382/312 |
| 2003/0090588 A1 * | 5/2003 | Wu ............................. | 348/373 |

FOREIGN PATENT DOCUMENTS

| | | |
|---|---|---|
| JP | 3-30581 | 2/1991 |
| JP | 3-72789 | 3/1991 |
| TW | 400458 | 8/2000 |
| WO | WO-01/91193 A2 | 11/2001 |

* cited by examiner

*Primary Examiner*—Ngoc-Yen Vu
*Assistant Examiner*—Dan Pasiewicz
(74) *Attorney, Agent, or Firm*—David G. Conlin; Steven M. Jensen; Edwards Angell Palmer & Dodge LLP

(57) ABSTRACT

A camera module includes a solid-state imaging device; a lens unit having a lens for guiding light to the solid-state imaging device; a lens holder for holding the solid-state imaging device, the lens holder including a lens coupling section provided for adjusting the position of the lens, such that a distance between the lens and the solid-state imaging device becomes a prescribed focusing distance; and a shield cap for covering the lens coupling section and the lens unit so as to allow the light to be guided to the lens in the lens unit.

4 Claims, 9 Drawing Sheets

SOLID-STATE IMAGING MODULE WITH FRICTIONALLY ATTACHED SHIELD CAP

BACKGROUND OF THE INVENTION

1. Field of the Invention

The present invention relates to a camera module, and in particular to a camera module, for example, a CMOS camera module, including a holder for holding a solid-state imaging device and a lens.

2. Description of the Related Art

A CMOS camera module, including a lens holder for holding a solid-state imaging device such as a CCD or the like and a lens unit having a lens for guiding light to the solid-state imaging device, is widely used for, for example, a cellular phone or a mobile terminal.

FIG. 10 shows a manner of assembling a conventional CMOS camera module 90. The CMOS camera module 90 includes a sensor 1 as a solid-state imaging device such as a CCD or the like, a lens unit 2 having a lens 8 for guiding light to the sensor 1, and a lens holder 93 for holding the sensor 1 and the lens unit 2. The lens holder 93 includes a holder base 94 having a general shape of rectangular parallelepiped and a generally cylindrical, hollow lens coupling section 95 provided on a central portion of a top surface of the holder base 94. The sensor 1 also has a general shape of rectangular parallelepiped and is smaller than the holder base 94. The sensor 1 is accommodated in the holder base 94. The sensor 1 includes a semiconductor chip, which is protected by a glass lid. The glass lid encapsulates the semiconductor chip. Even if dust adheres to the glass lid, the dust can be wiped off.

The lens unit 2 is generally cylindrical and has an outer diameter which is substantially the same as an outer diameter of the lens coupling section 95. The lens unit 2 can be coupled with the lens coupling section 95 through threads as follows. In a portion of an outer circumferential surface of the lens unit 2 close to the lens holder 93, a male thread 10 is formed. In an inner circumferential surface of the lens coupling section 95, a female thread 9 is formed which is engageable with the male thread 10.

When the lens unit 2 is inserted into the lens coupling section 95 while rotating the lens unit 2 in a prescribed direction, the male thread 10 of the lens unit 2 and the female thread 9 of the lens coupling section 95 are engaged with each other. When the lens unit 2 is further rotated in the same direction, the lens unit 2 becomes closer to the sensor 1 in a direction of an optical axis of the lens unit 2. When the lens unit 2 is rotated in the opposite direction, the lens unit 2 becomes farther from the sensor 1 in the direction of the optical axis of the lens unit 2. In this manner, the lens 8 in the lens unit 2 is focused on the sensor 1 by adjusting the distance between the lens unit 2 and the sensor 1 in this manner while checking an image obtained by the sensor 1 using an imaging jig (not shown). (The operation of focusing the lens unit 2 on the sensor 1 will be referred to as "focus adjustment".) When the lens 8 in the lens unit 2 is focused on the sensor 1, an adhesive is caused to flow into a space between the female thread 9 and the male thread 10 so as to secure the lens unit 2 to the lens coupling section 95.

In order to strongly secure the lens unit 2 to the lens coupling section 95 of the lens holder 93, the entirety of the space between the female thread 9 and the male thread 10 needs to be filled with the adhesive. However, it is difficult to fill the space entirely. Even if this is possible, the amount of the adhesive provided in the space is insufficient to strongly secure the lens unit 2 to the lens coupling section 95 due to the narrowness of the space.

A camera module incorporated into a product, such as a cellular phone, is possibly exposed to an external force such as an impact. Unless the lens unit 2 and the lens holder 93, both included in the camera module, are secured strongly to each other, the distance between the sensor 1 and the lens unit 2 is changed from a prescribed distance. This may undesirably defocus the lens 8 in the lens unit 2 from the sensor 1, which results in the image obtained by the sensor 1 being blurred.

In the camera module incorporated into a cellular phone or the like, when the lens unit 2 and the lens holder 93 are exposed outside so as to be touched by a user or the like, electrostatic charges generated by a human hand is transferred to the lens holder 93. The glass lid for encapsulating the semiconductor chip, which is provided in the sensor 1, usually cannot shield electrostatic charges. Therefore, when the electrostatic charges are transferred to the semiconductor chip accommodated in the lens holder 93, the semiconductor chip may malfunction or be destroyed.

SUMMARY OF THE INVENTION

A camera module according to the present invention includes a solid-state imaging device; a lens unit having a lens for guiding light to the solid-state imaging device; a lens holder for holding the solid-state imaging device, the lens holder including a lens coupling section provided for adjusting the position of the lens, such that a distance between the lens and the solid-state imaging device becomes a prescribed focusing distance; and a shield cap for covering the lens coupling section and the lens unit so as to allow the light to be guided to the lens in the lens unit.

In one embodiment of the invention, the shield cap is formed of an electrically conductive material, and is electrically grounded.

In one embodiment of the invention, the lens holder is formed of an electrically conductive material, and is electrically grounded.

In one embodiment of the invention, the camera module further includes a projection provided on the lens coupling section, the projection being in pressure contact with an inner circumferential surface of the shield cap for securing the shield cap to the lens coupling section.

Thus, the invention described herein makes possible the advantages of providing (1) a camera module capable of taking a clear image even when exposed to an external force such as an impact or the like, and (2) a camera module capable of preventing the electrostatic charges from causing malfunction of or destroying the sensor.

These and other advantages of the present invention will become apparent to those skilled in the art upon reading and understanding the following detailed description with reference to the accompanying figures.

DESCRIPTION OF THE PREFERRED EMBODIMENTS

Figure 1:
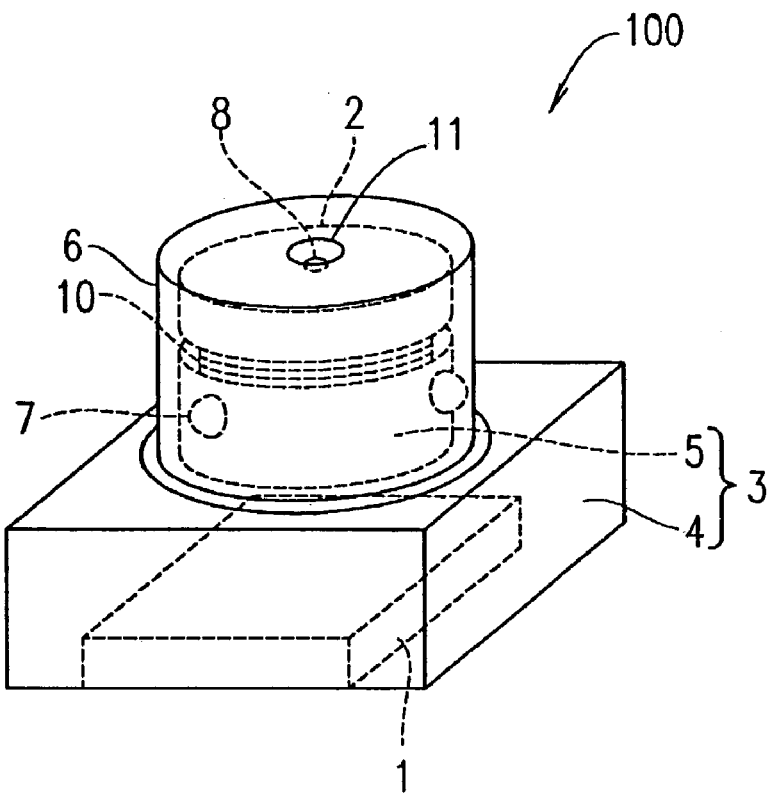
FIG. 1 is a perspective view of a camera module according to an example of the present invention.

Hereinafter, the present invention will be described by way of illustrative examples with reference to the accompanying drawings. Throughout this specification, identical elements bear identical reference numerals and the detailed descriptions thereof are not repeated.

Figure 2:
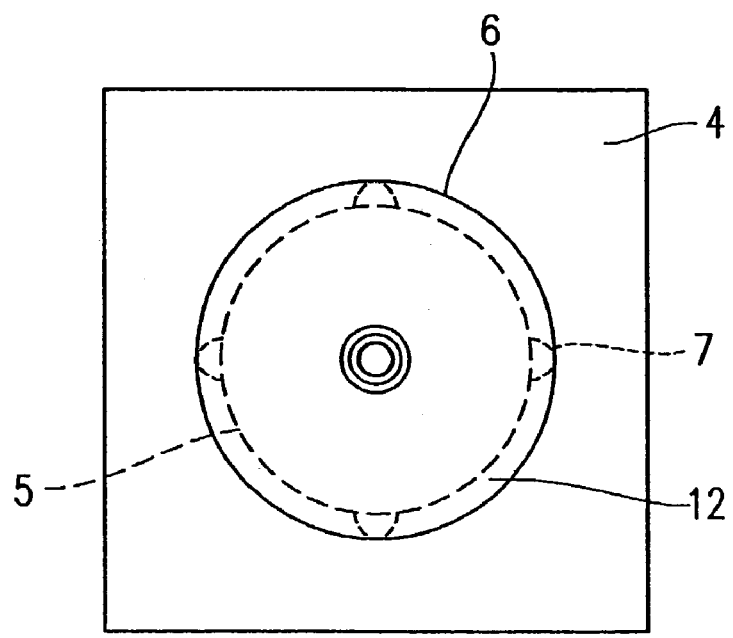
FIG. 2 is a plan view of the camera module shown in FIG. 1.

FIG. 1 is a perspective view of a camera module 100 according to an example of the present invention. FIG. 2 is a plan view of the camera module 100. The camera module 100 takes a clear image even when exposed to an external force such as an impact or the like.

The camera module 100 includes a lens holder 3. The lens holder 3 includes a holder base 4 having a general shape of rectangular parallelepiped, and a generally cylindrical, hollow lens coupling section 5 provided on a central portion of a top surface of the holder base 4. The lens coupling section 5 has an outer diameter of, for example, about 9 mm. The camera module 100 includes a sensor 1 which has a general shape of rectangular parallelepiped and is smaller than the holder base 4. The sensor 1 is accommodated in the holder base 4. The sensor 1 is an example of a solid-state imaging device.

The lens unit 2 includes a lens 8. The lens unit 2 is generally cylindrical and has an outer diameter of, for example, about 9 mm. The outer diameter of the lens unit 2 is substantially equal to that of the lens coupling section 5. In a portion of an outer circumferential surface of the lens unit 2 close to the lens holder 3, a male thread 10 is formed. In an inner circumferential surface of the lens coupling section 5, a female thread (not shown) is formed which is engageable with the male thread 10. The lens unit 2 is coupled with the lens coupling section 5 provided in the lens holder 3 through the engagement of the male thread 10 with the female thread.

Figure 3A:
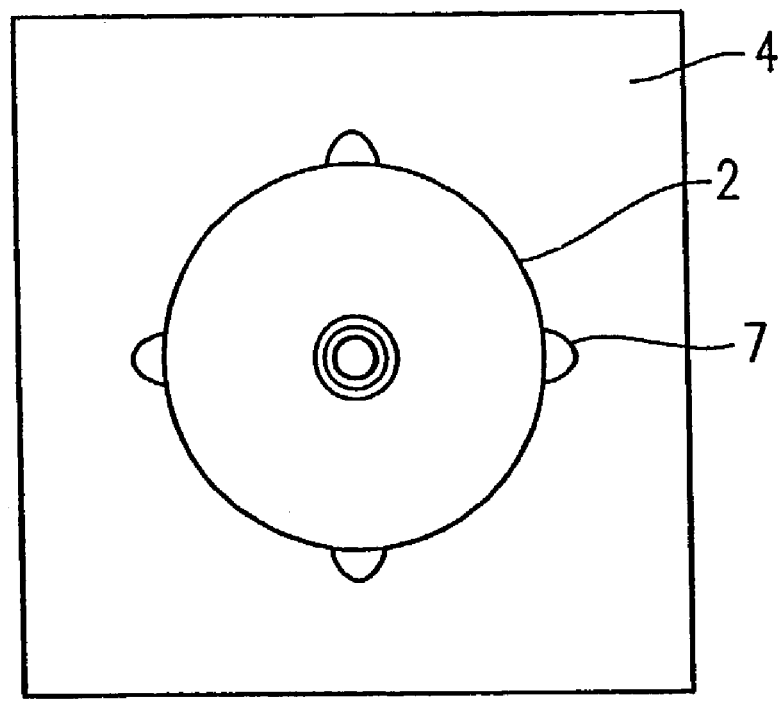
FIG. 3A is a plan view of a lens unit and a lens holder of the camera module shown in FIG. 1.
Figure 3B:
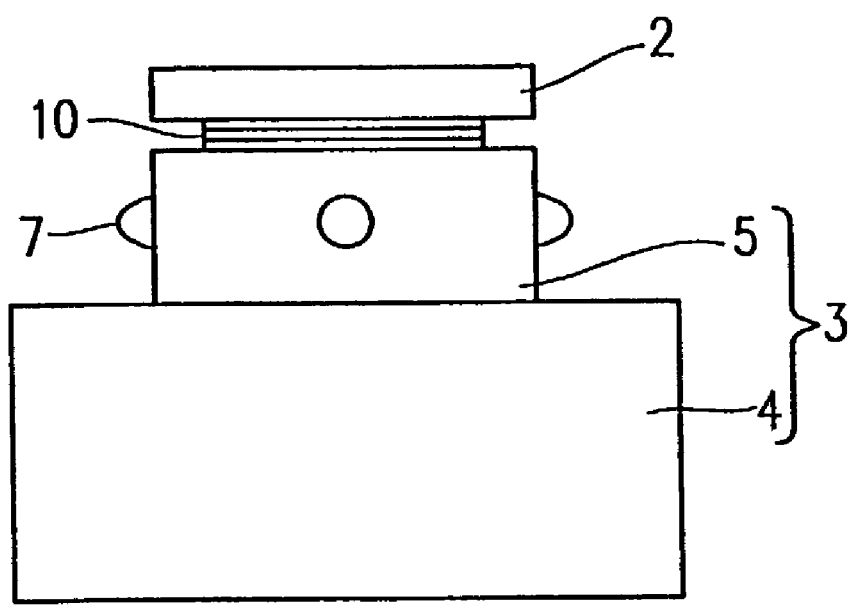
FIG. 3B is a front view of the lens unit and the lens holder of the camera module shown in FIG. 3A.

FIG. 3A is a plan view of an assembly of the lens holder 3 and the lens unit 2, both included in the camera module 100. FIG. 3B is a front view of the assembly. Four projections 7 are provided on an outer circumferential surface of the lens coupling section 5. The projections 7 are provided at the same height with an equal interval in the circumferential direction of the lens coupling section 5. Each projection 7 has a hemispheric shape and is elastically deformable. A tip of each projection 7 is on a phantom circle having a diameter of, for example, about 12 mm. The tip of each projection 7 is preferably curved.

As shown in FIG. 1, a cylindrical, hollow shield cap 6 is provided on the base holder 4 so as to cover the lens unit 2 and the lens coupling section 5. The shield cap 6 is concentric with the lens coupling section 5. An inner circumferential surface of the shield cap 6 has a diameter of, for example, about 11.2 mm, which is smaller than the diameter of the phantom circle, i.e., about 12 mm. Owing to such a structure, the inner circumferential surface of the shield cap 6 is in pressure contact with the tip of each projection 7, so that each projection 7 is elastically deformed. Because of the compressive stress generated in each projection 7, the shield cap 6 is strongly secured to the lens coupling section 5.

The inner circumferential surface of the shield cap 6 and the lens coupling section 5 has a gap 12 therebetween, excluding the projections 7. A light guide hole 11 is formed in a central portion of a top surface of the shield cap 6. The light guide hole 11 faces the lens 8 provided in the lens unit 2. Thus, the shield cap 6 allows light to be guided to the lens 8 in the lens unit 2. The shield cap 6 is formed of a electrically conductive material, for example, stainless steel (SUS).

The camera module 100 having the above-described structure is assembled in the following manner.

First, the sensor 1 is secured inside the holder base 4 of the lens holder 3 with an adhesive. Then, the lens unit 2 is inserted into the lens coupling section 5 while rotating the lens unit 2 in a prescribed direction, until the male thread 10 of the lens unit 2 and the female thread of the lens coupling section 5 are securely engaged with each other. When the lens unit 2 is further rotated in the same direction, the lens unit 2 becomes closer to the sensor 1 in a direction of an optical axis of the lens unit 2. When the lens unit 2 is rotated in the opposite direction, the lens unit 2 becomes farther from the sensor 1 in the direction of the optical axis of the lens unit 2. In this manner, the lens 8 in the lens unit 2 is focused on the sensor 1 by adjusting the distance between the lens unit 2 and the sensor 1 while checking an image obtained by the sensor 1 using an imaging jig (not shown). A distance between the sensor 1 and the lens unit 2, which is obtained when the lens 8 in the lens unit 2 is focused on the sensor 1, is referred to as a "focusing distance". When the focusing distance is obtained, an adhesive is caused to flow into a space between the female thread and the male thread 10 so as to secure the lens unit 2 to the lens coupling section 5.

Next, the shield cap 6 is provided over the lens unit 2 and the lens coupling section 5 having the projections 7. Since the diameter of the inner circumferential surface of the shield cap 6 is slightly smaller than the diameter of the phantom circle formed by the tips of the projections 7, the projections 7 are compressed by the inner circumferential surface of the shield cap 6 so as to be elastically deformed. Because of the compressive stress generated in each projection 7, the shield cap 6 is strongly secured to the lens coupling section 5.

In the case where the projections 7 are provided on the lens coupling section 5 as in this example, the inner circumferential surface of the shield cap 6 is in pressure contact only with the tip of each projection 7. Therefore, the frictional force, generated when the shield cap 6 is provided over the lens unit 2 and the lens coupling section 5, is smaller than the frictional force, generated when the shield cap 6 is put into pressure contact with the entirety of the outer circumferential surface of the lens coupling section 5 with no projection. Therefore, the operation of providing the shield cap 6 is easier and the operability is significantly higher in this example than the case where the lens coupling section 5 is not provided with any projection. In addition, since the diameter of the inner circumferential surface of the shield cap 6 is slightly smaller than the diameter of the phantom circle formed by the tips of the projections 7, the shield cap 6 can be strongly secured to the lens coupling section 5 by the compressive stress generated in each projection 7. Thus, it is not necessary to use an adhesive for securing the shield cap 6 to the lens coupling section 5.

The lens coupling section 5, which is covered with the shield cap 6, is not exposed to any external force such as an impact or the like. An external force, even if applied, is absorbed by the shield cap 6. Therefore, the lens 8 in the lens unit 2 is prevented from being defocused from the sensor 1 as a result of the distance between the sensor 1 and the lens unit 2 being changed from the focusing distance. Consequently, the camera module 100 takes a clear image with certainty.

Provision of the projections 7 on the lens coupling section 5 allows the shield cap 6, for absorbing an external force such as an impact, to be strongly secured to the lens coupling section 5 when the shield cap 6 is provided over the lens coupling section 5, with no need of using a coupling member such as an adhesive, a screw or the like. Thus, an external force can be absorbed without significantly increasing the costs of, or number of production steps of, the camera module 100.

Since the shield cap 6 is detachable, the focus adjustment can be re-done.

Provision of the projections 7 forms the gap 12 between the inner circumferential surface of the shield cap 6 and the outer circumferential surface of the lens coupling section 5. The gap 12 also absorbs the external force applied to the shield cap 6.

In this example, the diameter of the inner circumferential surface of the shield cap 6 is slightly smaller than the diameter of the phantom circle formed by the tips of the projections 7. Alternatively, the two diameters may be substantially the same as each other. Unless the diameter of the phantom circle is smaller than the diameter of the inner circumferential surface of the shield cap 6, the shield cap 6 does not easily come off from the lens coupling section 5.

In this example, the outer diameter of the lens unit 2 is substantially the same as that of the lens coupling section 5. Alternatively, the outer diameter of the lens unit 2 may be smaller than that of the lens coupling section 5.

As described above, the shield cap 6 covers the lens coupling section 5 of the lens holder 3 and the lens unit 2. Therefore, an external force is absorbed to the shield cap 6, and never acts on the lens coupling section 5 or the lens unit 2. Thus, the lens 8 in the lens unit 2 is prevented from being defocused from the sensor 1 as a result of the distance between the sensor 1 and the lens unit 2 being changed from the focusing distance. Consequently, the camera module 100 takes a clear image with certainty even when an external force such as an impact or the like is applied thereto.

As described above, the projections 7 provided on the lens coupling section 5 facilitates the operation of providing the shield cap 6 over the lens unit 2 and the lens coupling section 5, and also strongly secures the shield cap 6 to the lens coupling section 5.

Figure 4:
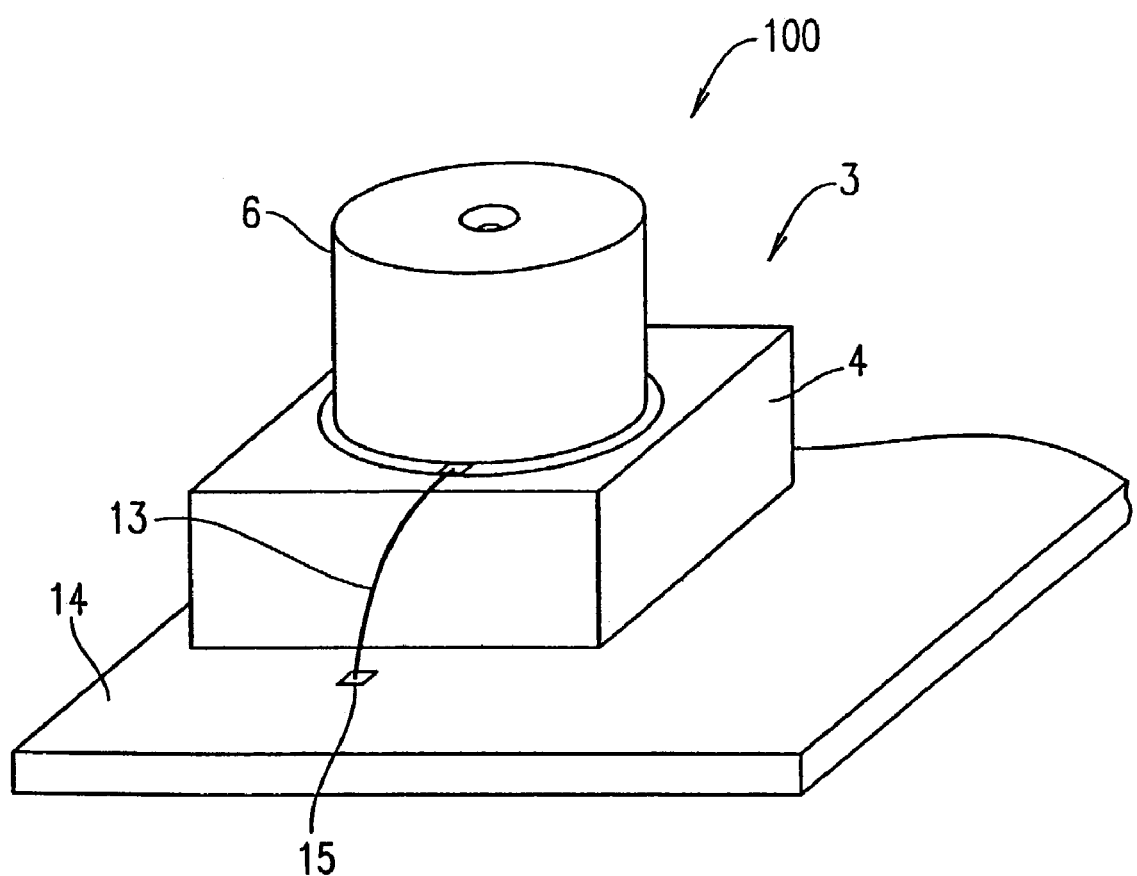
FIG. 4 is a perspective view of the camera module shown in FIG. 1, illustrating a shield cap which is grounded.

FIG. 4 is a perspective view of the camera module 100 where the shield cap 6 is grounded. The shield cap 6, which is formed of an electrically conductive material, may be electrically grounded as shown in FIG. 4. In the example shown in FIG. 4, the camera module 100 is mounted on a substrate 14, and the shield cap 6 is connected to a ground 15 provided on the substrate 14 via a lead 13.

With this structure, externally provided electrostatic charges flow to the ground 15 on the substrate 14 via the lead 13. Therefore, noise accompanying the electrostatic charges is shielded from the camera module 100, and also the electrostatic charges are prevented from reaching the inside of the lens holder 3. This protects the semiconductor chip in the sensor 1 accommodated in the holder base 4 against malfunction and destruction.

The shield cap 6 may be connected to a ground provided on a substrate having the sensor 1 mounted thereon. Alternatively, the shield cap 6 may be connected to a ground provided in a device incorporating the camera module 100, such as a cellular phone or the like. Still alternatively, the shield cap 6 may be connected to a ground provided on a circuit pattern in the lens holder 3. In this case, it is preferable that the ground provided on the circuit pattern is exposed outside a surface of the lens holder 3, such that the ground and the shield cap 6 become conductive to each other only by providing the shield cap 6 over the lens coupling section 5. With such a structure, it is not necessary to provide a line for connecting the shield cap 6 to the ground. This is advantageous to reduce the production costs of a product incorporating the camera module 100.

Instead of providing the lead 13, the following structure may be used. The lens coupling section 5 and the holder base 4 of the lens holder 3 are formed of an electrically conductive material, such that the lens holder 3 is conductive to the ground 15 provided on the substrate 14. With this structure also, noise accompanying the electrostatic charges is shielded from the camera module 100, and also the electrostatic charges are prevented from reaching the inside of the lens holder 3. With this structure, the shield cap 6 is satisfactory as long as it has a function of absorbing an external force, and does not need to have a function of shielding electrostatic charges. Therefore, the shield cap 6 may be formed of an electrically non-conductive material such as, for example, plastics.

Figure 5A:
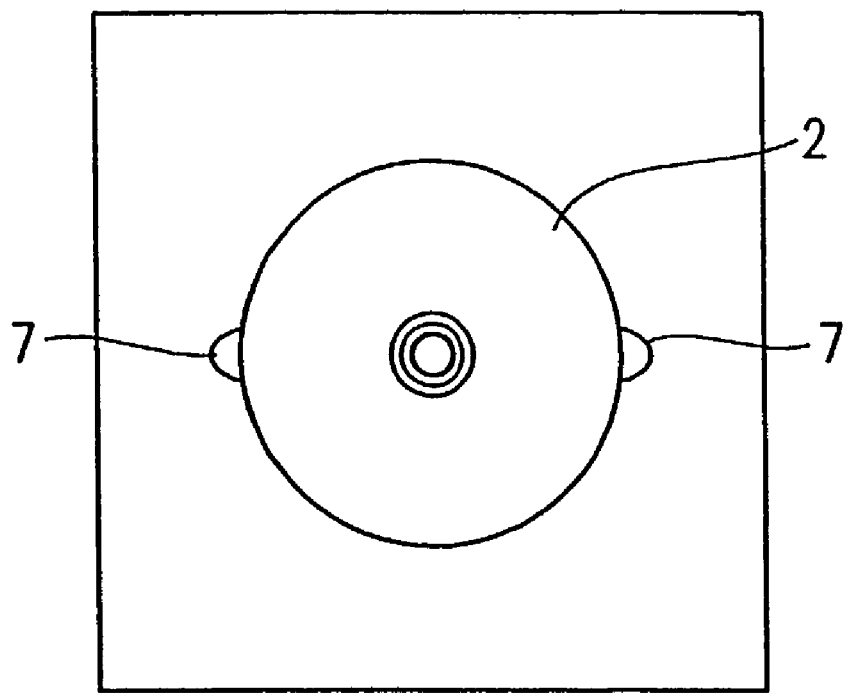
FIG. 5A is a plan view of a lens unit and a lens holder of a camera module according to another example of the present invention.
Figure 5B:
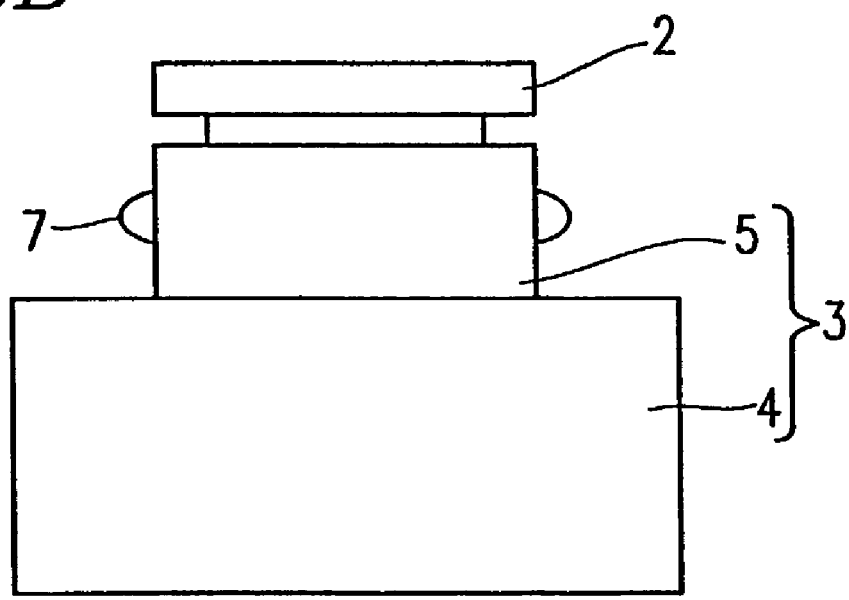
FIG. 5B is a front view of the lens unit and the lens holder of the camera module shown in FIG. 5A.

FIG. 5A is a plan view of an assembly of a lens unit 2 and a lens holder 3 included in a camera module according to another example of the present invention. FIG. 5B is a front view of the assembly. As shown in FIGS. 5A and 5B, the number of projections 7 provided on the outer circumferential surface of the lens coupling section 5 may be two, instead of four. The two projections 7 are provided at the same height with an equal interval in the circumferential direction of the lens coupling section 5.

Figure 6A:
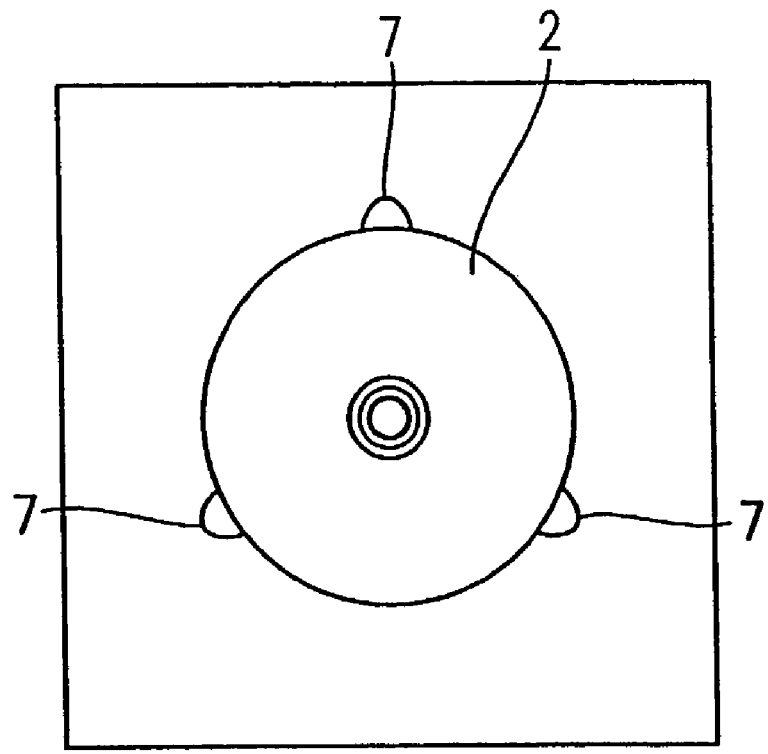
FIG. 6A is a plan view of a lens unit and a lens holder of a camera module according to still another example of the present invention.
Figure 6B:
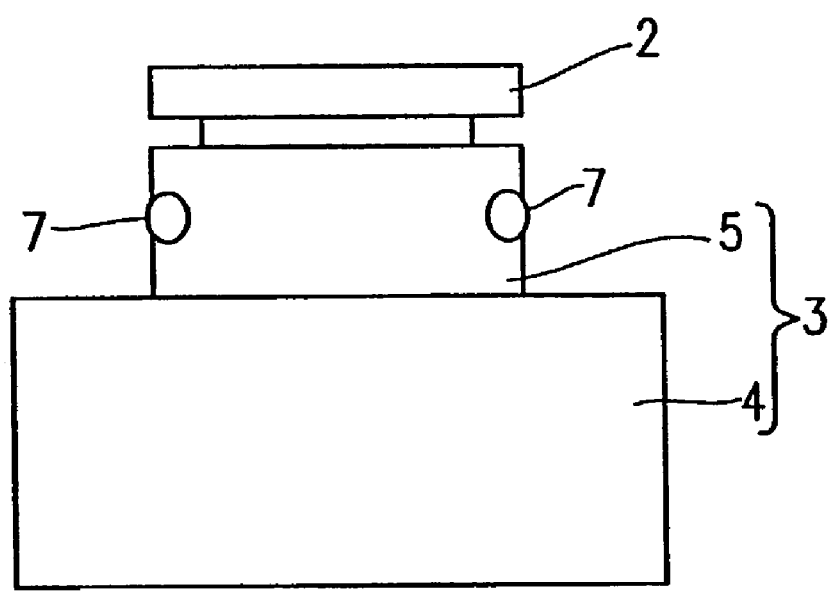
FIG. 6B is a front view of the lens unit and the lens holder of the camera module shown in FIG. 6A.

FIG. 6A is a plan view of an assembly of a lens unit 2 and a lens holder 3 included in a camera module according to still another example of the present invention. FIG. 6B is a front view of the assembly. As shown in FIGS. 6A and 6B, the number of projections 7 provided on the outer circumferential surface of the lens coupling section 5 may be three. The three projections 7 are provided at the same height with an equal interval in the circumferential direction of the lens coupling section 5. The number of the projections 7 may be an integer of five or greater.

Figure 7A:
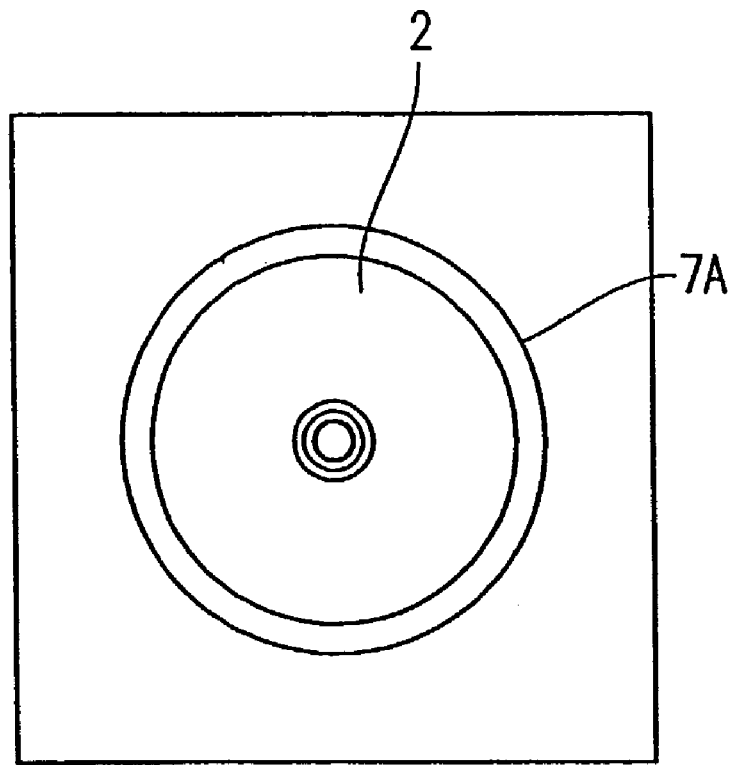
FIG. 7A is a plan view of a lens unit and a lens holder of a camera module according to still another example of the present invention.
Figure 7B:
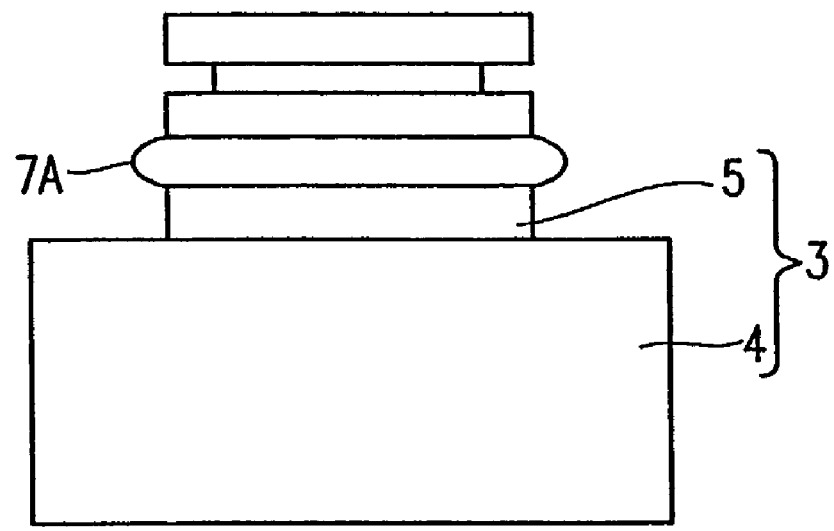
FIG. 7B is a front view of the lens unit and the lens holder of the camera module shown in FIG. 7A.

FIG. 7A is a plan view of an assembly of a lens unit 2 and a lens holder 3 included in a camera module according to still another example of the present invention. FIG. 7B is a front view of the assembly. As shown in FIGS. 7A and 7B, a projection 7A may be provided throughout the outer circumferential surface of the lens coupling section 5. The projection 7A is provided at the same height, and a cross-section thereof preferably has a curved tip.

Figure 8A:
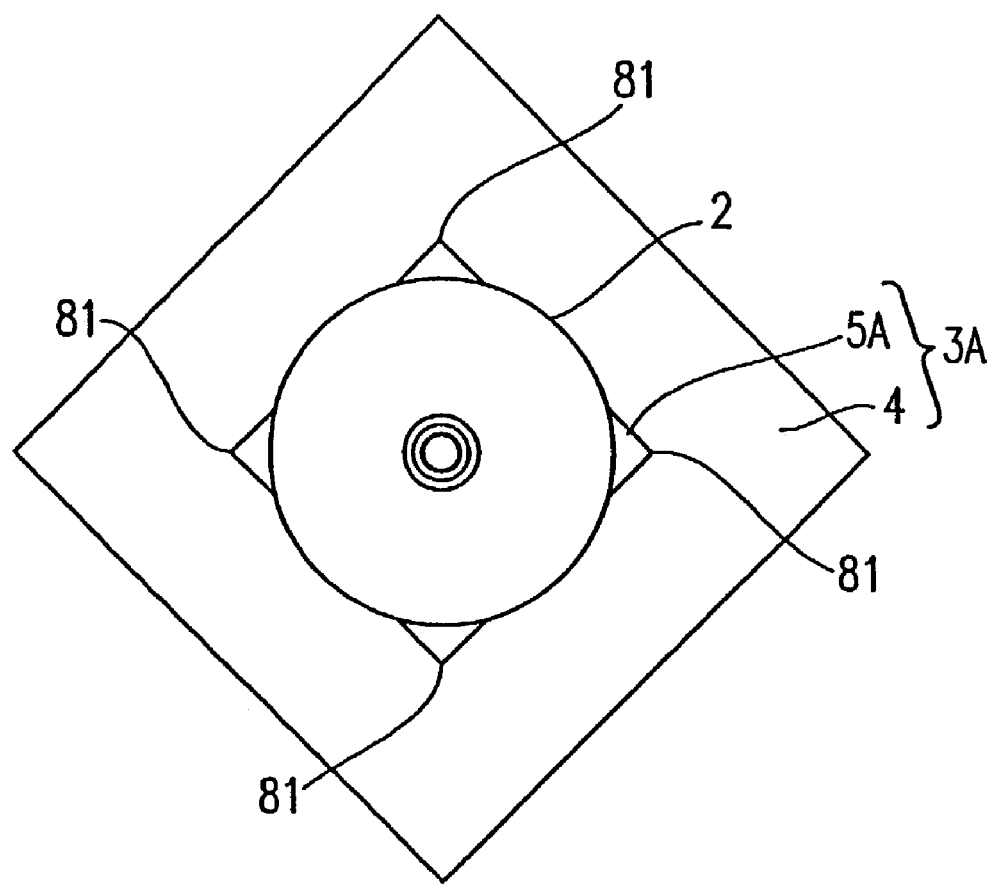
FIG. 8A is a plan view of a lens unit and a lens holder of a camera module according to still another example of the present invention.
Figure 8B:
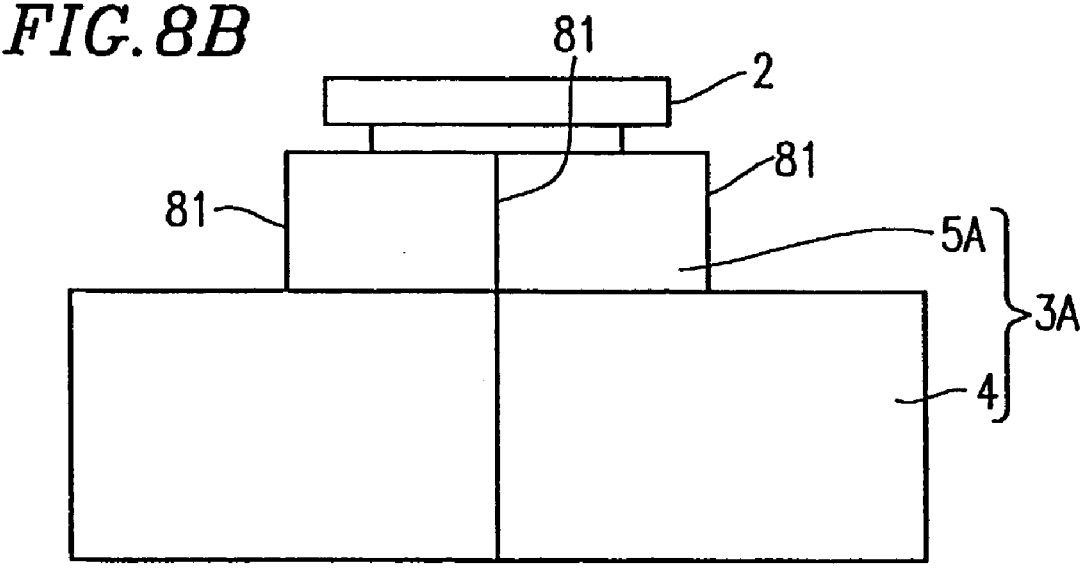
FIG. 8B is a front view of the lens unit and the lens holder of the camera module shown in FIG. 8A.

FIG. 8A is a plan view of an assembly of a lens unit 2 and a lens holder 3A included in a camera module according to still another example of the present invention. FIG. 8B is a front view of the assembly.

As shown in FIGS. 8A and 8B, the lens holder 3A includes a lens coupling section 5A having a shape of rectangular parallelepiped, instead of the cylindrical lens coupling section 5 and the four projections 7 shown in FIGS. 3A and 3B. The lens holder 3A also includes the holder base 4 having a shape of rectangular parallelepiped. The lens coupling section 5A is smaller than the holder base 4 and is provided on a central portion of the top surface of the holder base 4. The lens coupling section 5A and the holder base 4 are provided such that corresponding side surfaces thereof are parallel to each other.

The lens unit 2 is generally cylindrical. A diagonal line of a top surface of the lens coupling section 5A is longer than the outer diameter of the lens unit 2. When the assembly of the lens unit 2 and the lens holder 3 is seen from top of the lens unit 2, four corner portions 81 of the lens coupling section 5A, which extend vertically with respect to the top surface of the holder base 4, project from the generally circular perimeter of the lens unit 2. Each corner portion 81 includes an edge extending vertical with respect to the top surface of the holder base 4 and portions of two faces interposing the edge. The corner portions 81 have the same function as that of the projections 7 in FIGS. 3A and 3B. The edge of each corner portion 81 is on a phantom circle.

When the shield cap 6 (not shown in FIG. 8A or 8B) is provided so as to cover the lens unit 2 and the lens coupling section 5A, the diameter of the inner circumferential surface of the shield cap 6 is slightly smaller than the phantom circle formed by the edges of the corner portions 81. Therefore, the corner portions 81 are compressed by the inner circumferential surface of the shield cap 6 so as to be elastically deformed. Because of the compressive stress generated in each corner portion 81, the shield cap 6 is strongly secured to the lens coupling section 5A.

Figure 9:
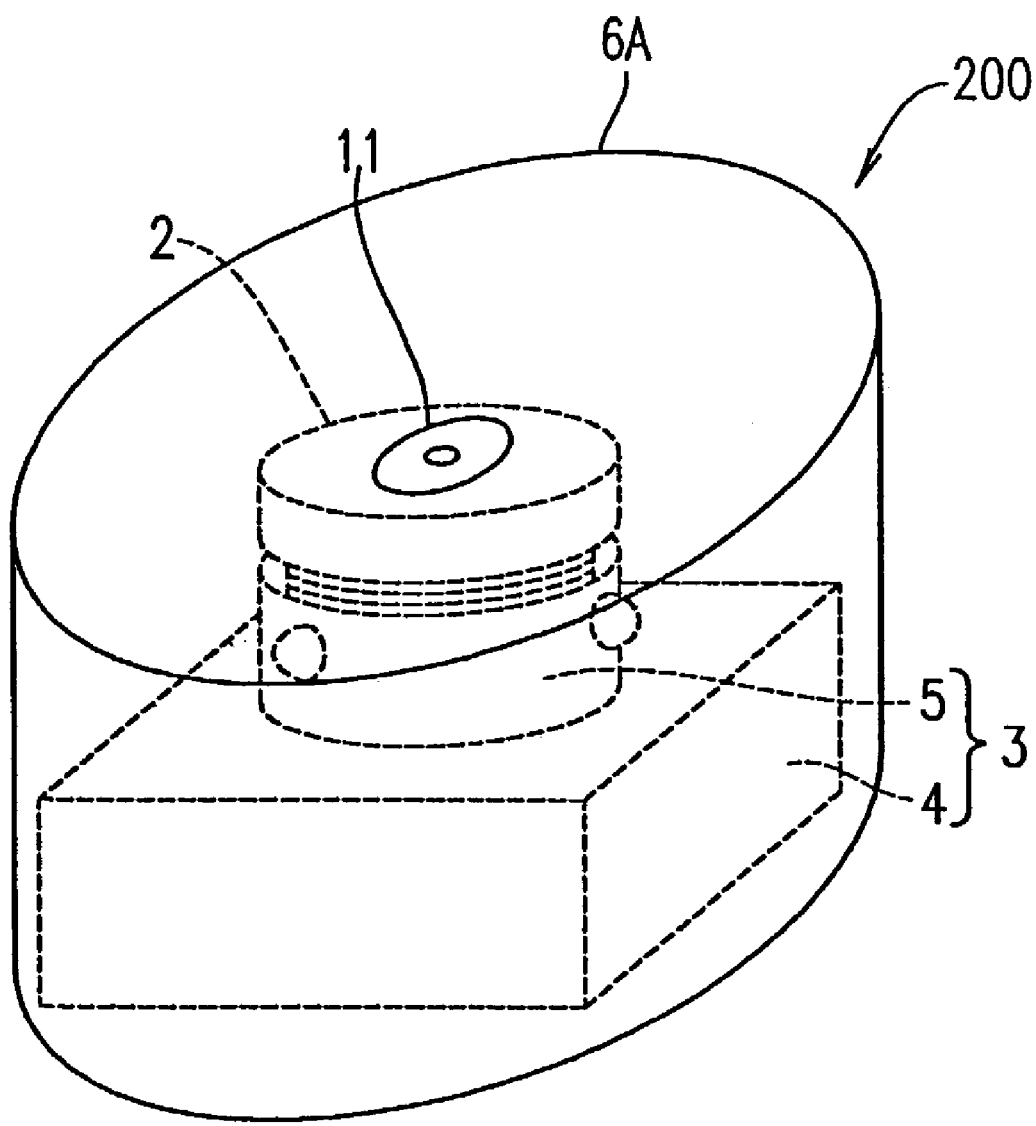
FIG. 9 is a perspective view of a camera module according to still another example of the present invention.
Figure 10:
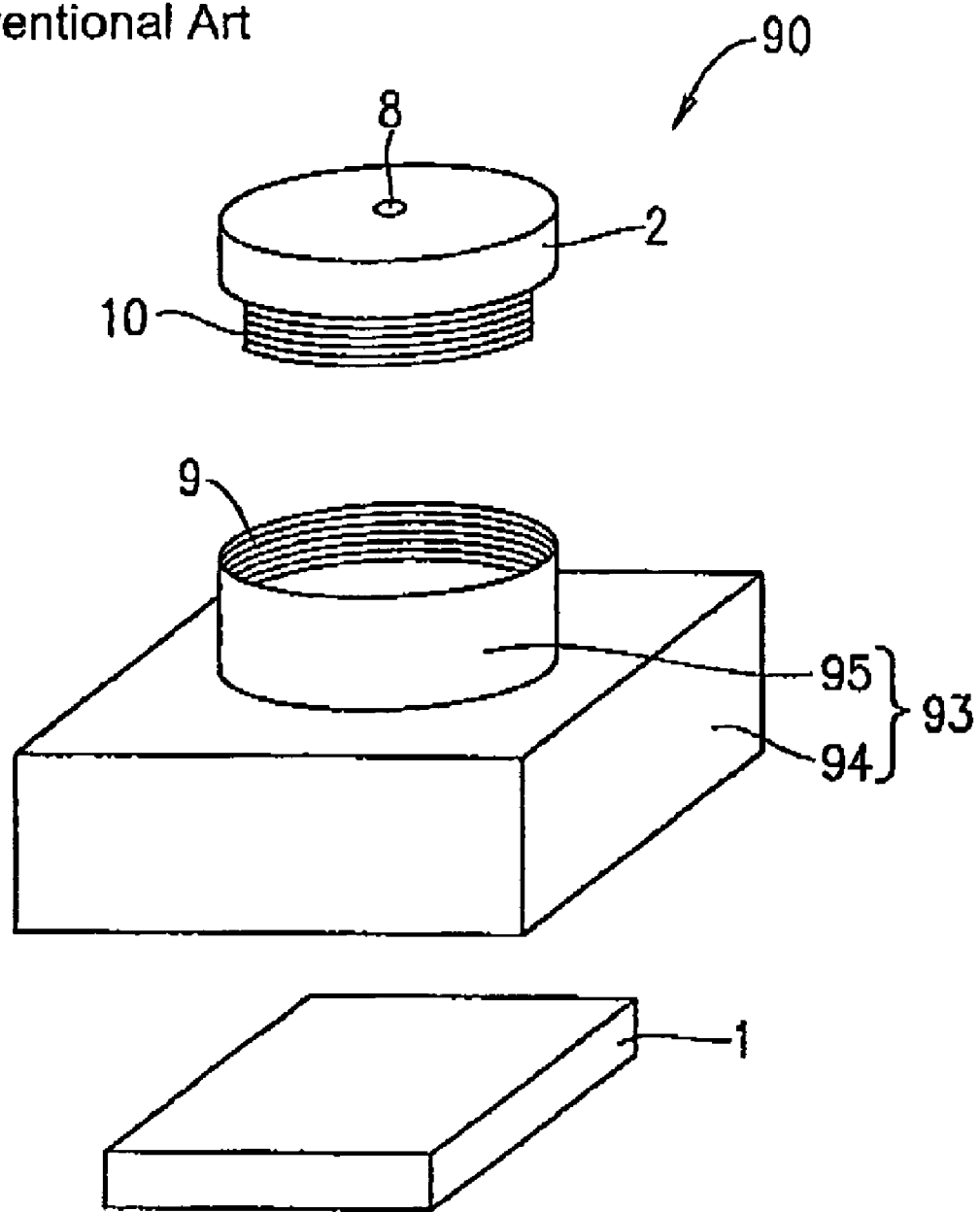
FIG. 10 shows a manner of assembling a conventional camera module.

FIG. 9 is a perspective view of a camera module 200 according to still another example of the present invention. As shown in FIG. 9, a shield cap 6A for covering the entirety of the lens holder 3 and the lens unit 2 may be provided instead of the shield cap 6 shown in FIG. 1 for covering the lens unit 2 and the lens coupling section 5. With this structure, an external force such as, for example, an impact, can be absorbed with certainty.

As described above, according to the present invention, a camera module capable of taking a clear image even when exposed to an external force such as an impact or the like can be provided.

According to the present invention, a camera module capable of preventing electrostatic charges from causing malfunctioning of or destroying the sensor can be provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A camera module, comprising:
   a solid-state imaging device;
   a lens unit having a lens for guiding light to the solid-state imaging device;
   a lens holder for holding the solid-state imaging device, the lens holder including a lens coupling section provided for adjusting the position of the lens, such that a distance between the lens and the solid-state imaging device becomes a prescribed focusing distance;
   a shield cap for covering the lens coupling section and the lens unit so as to allow the light to be guided to the lens in the lens unit, wherein a gap is provided between the shield cap and the lens coupling section, such that the shield cap does not directly contact the lens coupling section; and
   at least one projection provided on the lens coupling section, the at least one projection being in pressure contact with an inner circumferential surface of the shield cap for securing the shield cap to the lens coupling section,
   wherein the shield cap contacts the lens coupling section only through a tip of the at least one projection.

2. A camera module according to claim 1, wherein the shield cap is formed of an electrically conductive material, and is electrically grounded.

3. A camera module according to claim 1, wherein the lens holder is formed of an electrically conductive material, and is electrically grounded.

4. A camera module according to claim 1, wherein the at least one projection includes two or more projections provided at equal intervals in the circumferential direction of the lens coupling section.

* * * * *